United States Patent
Shah et al.

(10) Patent No.: US 9,531,504 B1
(45) Date of Patent: Dec. 27, 2016

(54) BUNDLING ACKNOWLEDGMENTS BASED ON SIGNAL QUALITY

(71) Applicant: Sprint Spectrum L.P., Overland Park, KS (US)

(72) Inventors: Maulik K. Shah, Overland Park, KS (US); Siddharth S. Oroskar, Overland Park, KS (US); Jasinder P. Singh, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 320 days.

(21) Appl. No.: 14/227,577

(22) Filed: Mar. 27, 2014

(51) Int. Cl.
*H04L 1/18* (2006.01)

(52) U.S. Cl.
CPC ............. *H04L 1/1825* (2013.01); *H04L 1/18* (2013.01)

(58) Field of Classification Search
CPC .......... H04L 1/1825; H04L 29/04; H04L 1/18; H04L 1/06; H04J 11/00
See application file for complete search history.

(56) References Cited

U.S. PATENT DOCUMENTS

| | | | |
|---|---|---|---|
| 6,308,294 B1 | 10/2001 | Ghosh et al. | |
| 6,631,127 B1 | 10/2003 | Ahmed et al. | |
| 6,697,987 B2 | 2/2004 | Lee et al. | |
| 6,925,132 B2 | 8/2005 | Song et al. | |
| 7,002,993 B1 | 2/2006 | Mohaban et al. | |
| 7,136,929 B2 | 11/2006 | Koprivica | |
| 7,206,280 B1 | 4/2007 | Khan et al. | |
| 7,388,919 B2 | 6/2008 | Varma et al. | |
| 7,447,968 B2 | 11/2008 | Ha et al. | |
| 7,715,347 B2 | 5/2010 | Yoon et al. | |
| 7,978,626 B1 | 7/2011 | Khanka et al. | |
| 8,369,337 B1 * | 2/2013 | Singh ................... | H04W 48/06 370/332 |
| 2004/0141525 A1 | 7/2004 | Bhushan et al. | |
| 2004/0179475 A1 | 9/2004 | Hwang et al. | |
| 2006/0013216 A1 | 1/2006 | Rajkotia et al. | |
| 2006/0109810 A1 | 5/2006 | Au et al. | |
| 2007/0070952 A1 | 3/2007 | Yoon et al. | |
| 2007/0091816 A1 | 4/2007 | Lee et al. | |
| 2007/0110095 A1 | 5/2007 | Attar et al. | |
| 2007/0168822 A1 | 7/2007 | Vitebsky et al. | |
| 2007/0214400 A1 | 9/2007 | Smith et al. | |
| 2007/0300120 A1 | 12/2007 | Kim et al. | |

(Continued)

FOREIGN PATENT DOCUMENTS

WO    2007/059523    5/2007

OTHER PUBLICATIONS

IEEE 802.16 Broadband Wireless Access Working Group <http://ieee802.org/16>, Aggregated H-ARQ, Lim Geunhwi, et al., Nov. 4, 2004.

*Primary Examiner* — Ian N Moore
*Assistant Examiner* — Latresa McCallum

(57) ABSTRACT

One or more indications of signal quality as measured by a wireless communication device (WCD) served by a radio access network (RAN) may be transmitted from the WCD to the RAN. A determination may be made that the one or more indications of signal quality meet or exceed a threshold signal quality. Possibly based on the one or more indications of signal quality meeting or exceeding the threshold signal quality, the WCD may bundle at least some hybrid automatic repeat request (HARD) acknowledgments that the WCD transmits to the RAN.

11 Claims, 6 Drawing Sheets

(56) References Cited

U.S. PATENT DOCUMENTS

| | | |
|---|---|---|
| 2008/0130643 A1 | 6/2008 | Jain et al. |
| 2008/0168321 A1 | 7/2008 | Lim et al. |
| 2008/0194284 A1 | 8/2008 | Choi et al. |
| 2009/0016265 A1 | 1/2009 | Katayama et al. |
| 2009/0129276 A1 | 5/2009 | Dendy |
| 2009/0319854 A1 | 12/2009 | Qian et al. |
| 2009/0327443 A1 | 12/2009 | Pawar et al. |
| 2010/0091735 A1 | 4/2010 | Kim et al. |
| 2010/0135156 A1 | 6/2010 | Sarkar |
| 2011/0280195 A1* | 11/2011 | Muppalla ............. H04L 1/0007 370/329 |
| 2012/0039227 A1 | 2/2012 | Chen et al. |
| 2015/0237644 A1 | 8/2015 | Golitschek Edler von Elbwart et al. |

* cited by examiner

BUNDLING ACKNOWLEDGMENTS BASED ON SIGNAL QUALITY

BACKGROUND

Wireless networks may provide packet-based services to wireless communication devices (WCDs). For example, a radio access network (RAN) may define one or more wireless coverage areas through which the WCDs may obtain wireless communication services from the RAN. A particular WCD may communicate with the RAN via one or more of the RAN's base stations. In order to make this communication more efficient, for example, the RAN may derive one or more subpackets from a full packet to be transmitted to a WCD. The RAN may transmit at least one of these subpackets to the particular WCD. The particular WCD may transmit an acknowledgment (positive or negative) in response to each subpacket that it receives.

OVERVIEW

Communication networks in general, and wireless networks in particular, are subject to impairments that can lead to packet corruption and packet loss. For instance, a wireless signal can suffer from various types of attenuation, reflections, and/or interference. In order to address these problems, and to reduce the effective packet loss rate of a channel, forward error correction (FEC) schemes may be used.

In general, FEC schemes permit a transmitting device, such as a base station, to transmit multiple copies of part or all of a packet to a client node, such as a WCD. Some copies may include FEC coding, for example XOR coding, Reed-Solomon coding, or turbo codes. If a WCD receives a packet with errors, it may be able to apply FEC codes contained within the packet, or contained within packets it has previously received or will subsequently receive, to properly decode the packet. In this way, packet error rates may be reduced.

One method of implementing FEC is through the use of hybrid automatic repeat request (HARQ). Using HARQ, a base station that seeks to transmit a full packet to a WCD instead transmits one or more HARQ subpackets. The HARQ subpackets may be derived from the full packet, and therefore may contain copies of part or all of the full packet. Each HARQ subpacket may also contain an extent of FEC coding. The WCD may transmit a negative acknowledgment (N-ACK) in response to each HARQ subpacket it receives until the WCD can decode the full packet from the series of subpackets. Once the WCD is able to decode the full packet, it may transmit a positive acknowledgment (P-ACK) to the base station.

The use of HARQ over frequency-division duplex (FDD) channels may result in N-ACKs and P-ACKs being transmitted at a relatively fixed time offset after their associated HARQ subpackets are transmitted. However, on time-division duplex (TDD) channels, forward-direction (downlink) traffic is separated from reverse-direction (uplink) traffic by allocation of different respective time slots in a particular frequency band. These time slots may be allocated unequally between the forward and reverse directions in order to accommodate various asymmetric traffic patterns. Thus, in some cases, there may be fewer reverse-direction time slots, in which a WCD can transmit HARQ acknowledgments to a base station, than forward-direction time slots, in which the base station can transmit HARQ subpackets to the WCD.

To accommodate this situation, HARQ acknowledgments may be bundled such that a single HARQ acknowledgment serves to acknowledge more than one HARQ subpacket. For instance, in a possible configuration, each HARQ acknowledgment may acknowledge two consecutive HARQ subpackets. If the HARQ acknowledgment is a P-ACK, then it serves to positively acknowledge both of the two associated HARQ subpackets. However, if the HARQ acknowledgment is an N-ACK, it indicates that one, the other, or both of the two associated HARQ subpackets were not properly received. After such an N-ACK is received, the base station may retransmit the two associated HARQ subpackets, or some variation thereof.

A possible disadvantage to bundled HARQ acknowledgments is that when one HARQ subpacket in a group of HARQ subpackets associated with same HARQ acknowledgment is not properly received, all of the HARQ subpackets in the group may be re-transmitted. This can be wasteful since retransmission of the properly received HARQ subpackets is not necessary.

In order to accommodate for this disadvantage, HARQ bundling may be activated when it is likely that fewer N-ACKs will be transmitted. Similarly, HARQ bundling may be deactivated when it is likely that a greater number of N-ACKs will be transmitted.

Accordingly, in a first example embodiment, a RAN may receive one or more indications of signal quality as measured by a WCD served by the RAN. It may be determined that each of the one or more indications of signal quality meets or exceeds a threshold signal quality. Possibly based on the one or more indications of signal quality meeting or exceeding the threshold signal quality, the RAN may instruct the WCD to bundle at least some HARQ acknowledgments that the WCD transmits to the RAN.

In a second example embodiment, a WCD served by a RAN may measure a signal quality of a TDD wireless channel of the RAN. The WCD may transmit, to the RAN, a representation of the measured signal quality. The WCD may receive, from the RAN, an instruction to bundle at least some HARQ acknowledgments that the WCD transmits to the RAN. In response to a plurality of HARQ subpackets that the WCD receives from the RAN, the WCD may transmit a single HARQ acknowledgment message to the RAN.

In a third example embodiment, a RAN may include a base station device, a signal quality assessment module, and a communication module. The base station device may be configured to define one or more TDD wireless channels that can serve WCDs. The signal quality assessment module may be configured to receive signal quality indications from served WCDs and determine whether the signal quality indications meet or exceed a signal quality threshold. The communication module may be configured to support a first mode and a second mode of HARQ communication between the base station and the served WCDs. The RAN may be configured to enter the first mode for a particular served WCD in response to the signal quality assessment module receiving, from the particular served WCD, one or more signal quality indications that meet or exceed the signal quality threshold. The RAN may be configured to enter the second mode for the particular served WCD in response to the signal quality assessment module receiving, from the particular served WCD, one or more signal quality indications that do not meet or exceed the signal quality threshold. The first mode may involve the base station instructing the particular served WCD to bundle at least some HARQ acknowledgments that the particular served WCD transmits to the base station. The second mode may involve the base station instructing the particular served WCD to not bundle any HARQ acknowledgments that the particular served WCD transmits to the base station.

A fourth example embodiment may include a non-transitory, computer-readable storage medium, having stored thereon program instructions that, upon execution by a computing device, cause the computing device to perform operations in accordance with the first, second, and/or third example embodiment.

A fifth example embodiment may include a computing device containing at least a processor and data storage. The data storage may include program instructions that, when executed by the processor, cause the computing device to perform operations in accordance with the first, second, and/or third example embodiment.

These and other aspects and advantages will become apparent to those of ordinary skill in the art by reading the following detailed description, with reference where appropriate to the accompanying drawings. Further, it should be understood that this overview and other description throughout this document is merely for purposes of example and is not intended to limit the scope of the invention as claimed.

DETAILED DESCRIPTION

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

1. Example Wireless Communication System

Figure 1:
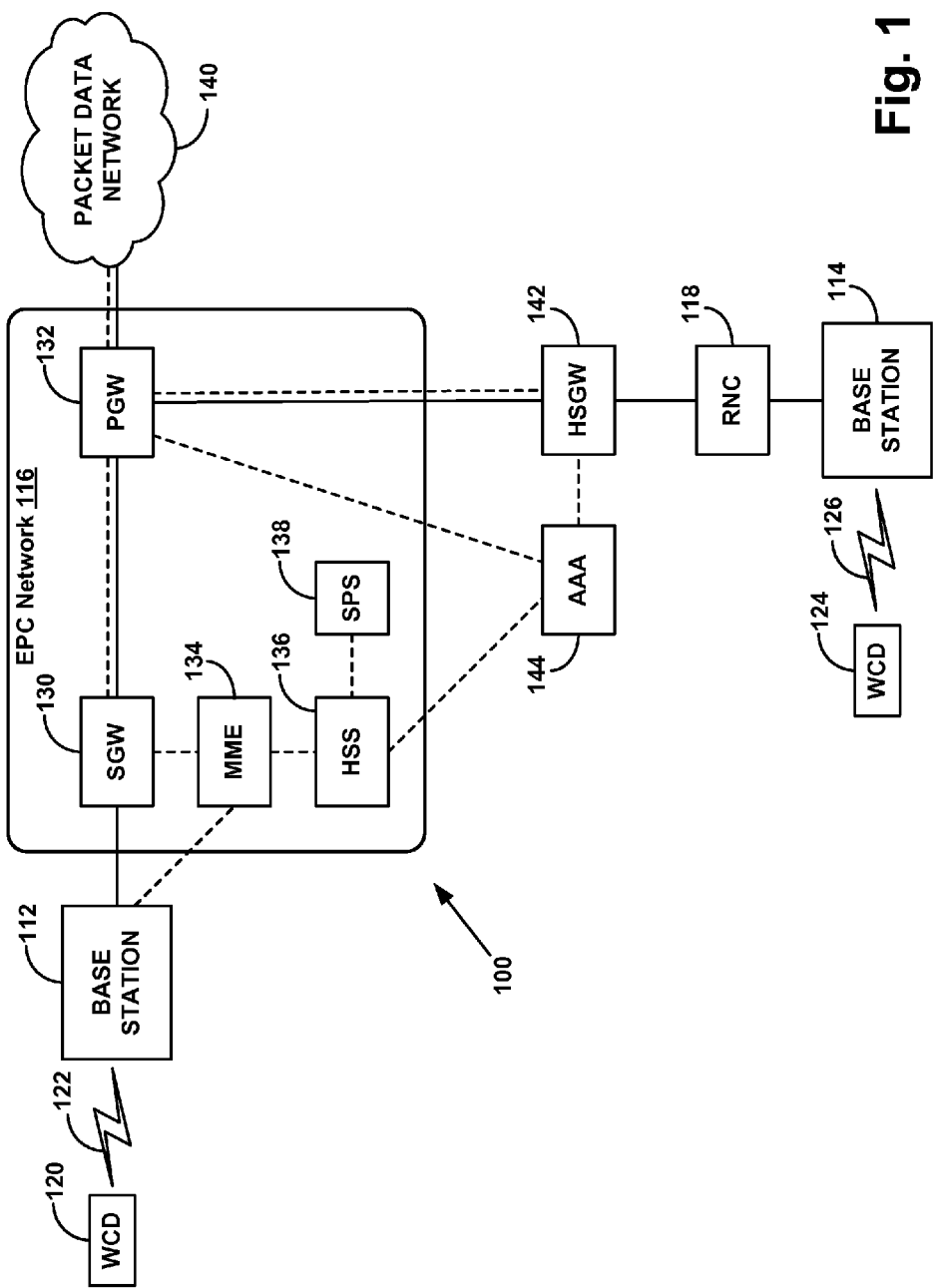
FIG. 1 is a block diagram of a wireless communication system, in accordance with an example embodiment.

FIG. 1 illustrates an example wireless communication system 100, which may be related to aspects of the present disclosure. In this example, wireless communication system 100 includes two different types of base stations, exemplified by base station 112 and base station 114. Base station 112 (e.g., an eNodeB) is part of an evolved radio access network (RAN) that uses an Evolved Packet Core (EPC) network 116. Base station 114 is part of a legacy RAN that includes a radio network controller (RNC) 118. Base stations 112 and 114 each provide one or more respective wireless coverage areas through which the respective base station can communicate with one or more WCDs. The wireless coverage areas provided by base stations 112 and 114 could be either overlapping or non-overlapping.

A WCD may be referred to as user equipment (UE). Despite this nomenclature, a WCD need not be an end-user device, and may include various types of devices that have limited interactions with human users.

In FIG. 1, connections that carry bearer traffic are indicated by solid lines, connections that carry signaling traffic are indicated by dashed lines, and connections that carry both bearer traffic and signaling traffic are indicated by solid lines in combination with dashed lines. However, both bearer and signaling traffic may be communicated using interfaces and/or paths not explicitly marked as such in FIG. 1.

As shown, base station 112 is in wireless communication with WCD 120 via an air interface 122, and base station 114 is in wireless communication with WCD 124 via an air interface 126. WCDs 120 and 124 could be wireless telephones, wirelessly-equipped handheld, tablet, or laptop computers, or any other type of WCD. Each of air interfaces 122 and 126 may include forward direction channels for communication from the RAN to WCDs, and reverse direction channels for communication from the WCDs to the RAN.

Base stations 112 and 114 may communicate with WCDs using different air interface protocols. In one example, base station 112 communicates with WCDs, such as WCD 120, using a Long Term Evolution (LTE) protocol, whereas base station 114 communicates with WCDs, such as WCD 124, using a High Rate Packet Data (HRPD) protocol, such as Evolution Data-Only (EVDO). These air interface protocols, however, are given merely as illustrative examples. In general, base stations 112 and 114 may communicate using any air interface protocol that is known currently or may be developed.

As shown in FIG. 1, EPC network 116 includes a serving gateway (SGW) 130, a packet gateway (PGW) 132, a mobility management entity (MME) 134, a home subscriber server (HSS) 136, and a subscriber profile store (SPS) 138. PGW 132 may provide connectivity to a packet data network 140. SGW 130 may support the exchange of Internet Protocol (IP) bearer traffic between base station 112 and PGW 132. MME 134 may manage signaling traffic between base station 112 and various elements in EPC network 116, for example, relating to authentication of WCDs and activating and de-activating bearer connections for WCDs. HSS 136 may be configured to authenticate WCDs, as well as access subscriber profiles stored in SPS 138. For example, SPS 38 may store subscriber profiles for WCDs that are authorized to use EPC network 116.

With this configuration, EPC network 116 can provide packet data connections to packet data network 140 for WCDs served by base stations in an evolved RAN, for example, WCD 120 served by base station 112. The packet data connections that EPC network 116 provides to WCDs may, in turn, be used for Web access, email, text, voice-over-IP (VoIP), video, streaming media, gaming, and/or other packet data services.

In addition, EPC network 116 may provide packet data connections to packet data network 140 for WCDs served by other RANs, such as WCDs served by legacy RANs. In the example shown in FIG. 1, wireless communication system 100 includes an HRPD serving gateway (HSGW) 142 that supports interworking between a legacy RAN, exemplified in FIG. 1 by base station 114 and RNC 118, and EPC network 116. This interworking may involve (i) HSGW 142 communicating with an authentication, authorization, and accounting (AAA) server 144, which, in turn, may communicate with HSS 136, and (ii) HSGW 142 communicating with PGW 132.

For example, WCD 124, when served by base station 114, may transmit a data-connection request that relates to establishing a packet data connection. HSGW 142 may receive the data-connection request via base station 114 and RNC 118, and, in response, communicate with AAA 144 to authenticate WCD 124. As part of the authentication process, AAA 144 may perform various functions, such as communicating with HSS 136, issuing an authentication challenge to WCD 124, evaluating a response from WCD 124 to the authentication challenge, and indicating to HSGW 142 whether the authentication process is successful or unsuccessful. If the authentication process is successful, HSGW 142 may communicate with PGW 132 to request a packet data connection to packet data network 140 for WCD 124. In response to the request from HSGW 142, PGW 132 may communicate with AAA 144 to authenticate WCD 124 in another authentication process. If that authentication process is successful, PGW 132 may establish the packet data connection, which then enables WCD 124 to communicate with packet data network 140 via air interface 126, base station 114, RNC 118, HSGW 142, and PGW 132.

In general, the depictions of FIG. 1 are illustrative. Therefore, in a RAN, there could be more or fewer of each element than is shown, and some elements may be omitted altogether. Additionally, other types of elements not shown may be present. Further, any of these elements may be combined with one another, physically or logically, or distributed across multiple physical devices. Thus, the particular arrangement shown in FIG. 1 should not be viewed as limiting with respect to the present invention.

The arrangement of wireless communication system 100 and the processes described herein are set forth herein for purposes of example only. Other arrangements and elements (e.g., machines, interfaces, functions, orders of elements, etc.) can be added or used instead, and some elements may be omitted altogether. Further, those skilled in the art will appreciate that many of the elements described herein are functional entities that may be implemented as discrete components or in conjunction with other components, in any suitable combination and location, and that various disclosed functions can be implemented by any combination of hardware, firmware, and/or software, such as by one or more processors programmed to execute computer instructions for instance.

2. Example Computing Device

Figure 2:
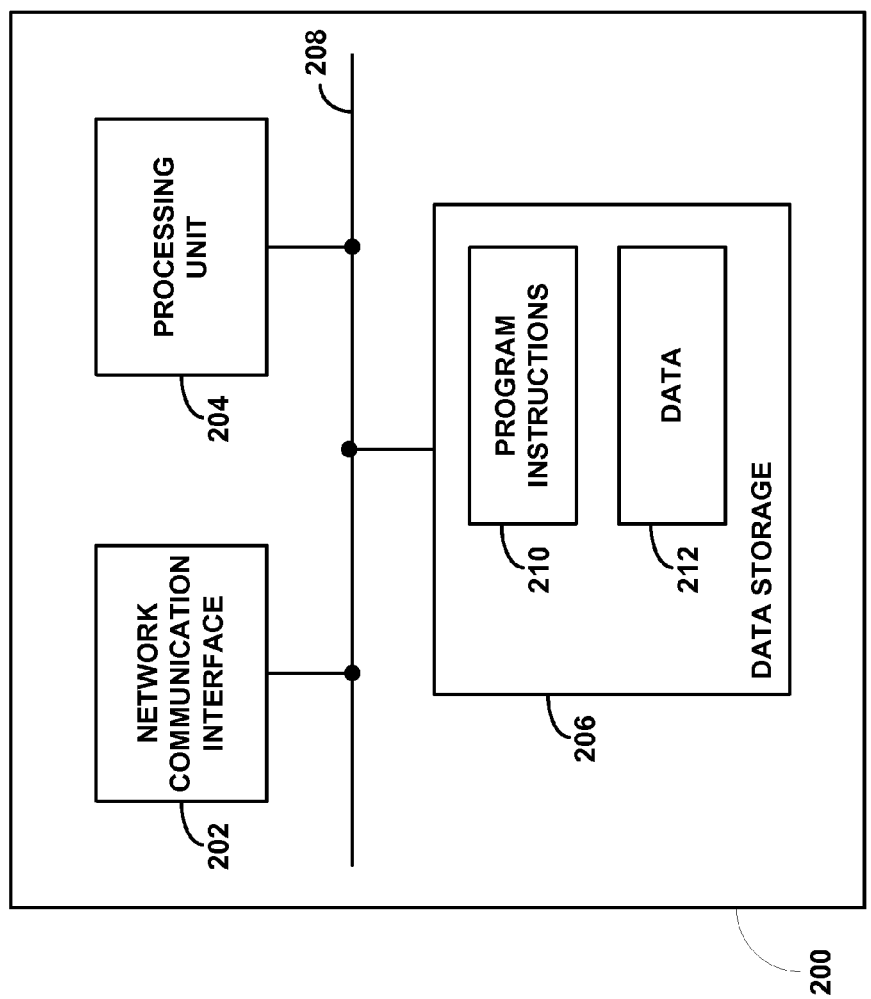
FIG. 2 is a block diagram of a computing device, in accordance with an example embodiment.

FIG. 2 is a block diagram of an example computing device 200. Computing device 200 could be a standalone general purpose or specialized computing device. Alternatively, computing device 200 could be a WCD or a part of the RAN. Thus, computing device 200 may represent a base station, MME, SGW, PGW, or some other type of RAN component or computer.

As shown, computing device 200 includes a network communication interface 202, a processing unit 204, and data storage 206, all of which may be communicatively linked together by a system bus, network, or other connection mechanism 208. Computing device 200 may also include additional components, functions and/or interfaces not shown in FIG. 2, such as a keyboard, a mouse, a touch screen, a monitor, a printer, and/or one or more ports that interface with such devices, for example a universal serial bus (USB) or high-definition multimedia interface (HDMI) port.

Network communication interface 202 may support communication with various other network entities, such as any of the network entities shown in FIG. 1. As such, interface 202 may include one or more network interface modules, such as Ethernet, Wifi, BLUETOOTH®, and/or wide-area wireless connection network interface modules, or any other type of wired and/or wireless communication interfaces.

Processing unit 204 may comprise one or more general purpose processors (e.g., microprocessors) and/or one or more special purpose processors (e.g., application specific integrated circuits, digital signal processors, and/or network processors). Data storage 206 may comprise one or more volatile and/or non-volatile non-transitory storage components, such as optical, magnetic, or flash storage, and may be integrated in whole or in part with processing unit 204.

As shown, data storage 206 may hold program instructions 210 and data 212. Program instructions 210 may be executable by processing unit 204 to carry out various functions described herein and/or depicted in the accompanying drawings. Data 212 could be any data that is generated, received, stored, or used in connection with carrying out such functions.

3. Example HARQ Communication

For purposes of illustration, this section describes examples of HARQ transmissions between base station 112 and WCD 120. In these examples, base station 112 transmits HARQ subpackets (possibly containing payload and/or FEC bits) to WCD 120 on a forward-direction channel, and WCD 120 transmits HARQ acknowledgments to base station 112 on a reverse direction channel.

Nonetheless, the procedures described herein may be carried out in other ways. For instance, the HARQ transmissions may take place between other types of devices, such as base station 114 and WCD 124. Alternatively, or additionally, the HARQ subpackets may be transmitted on a reverse-direction channel and the HARQ acknowledgments may be transmitted on a forward-direction channel.

Figure 3:
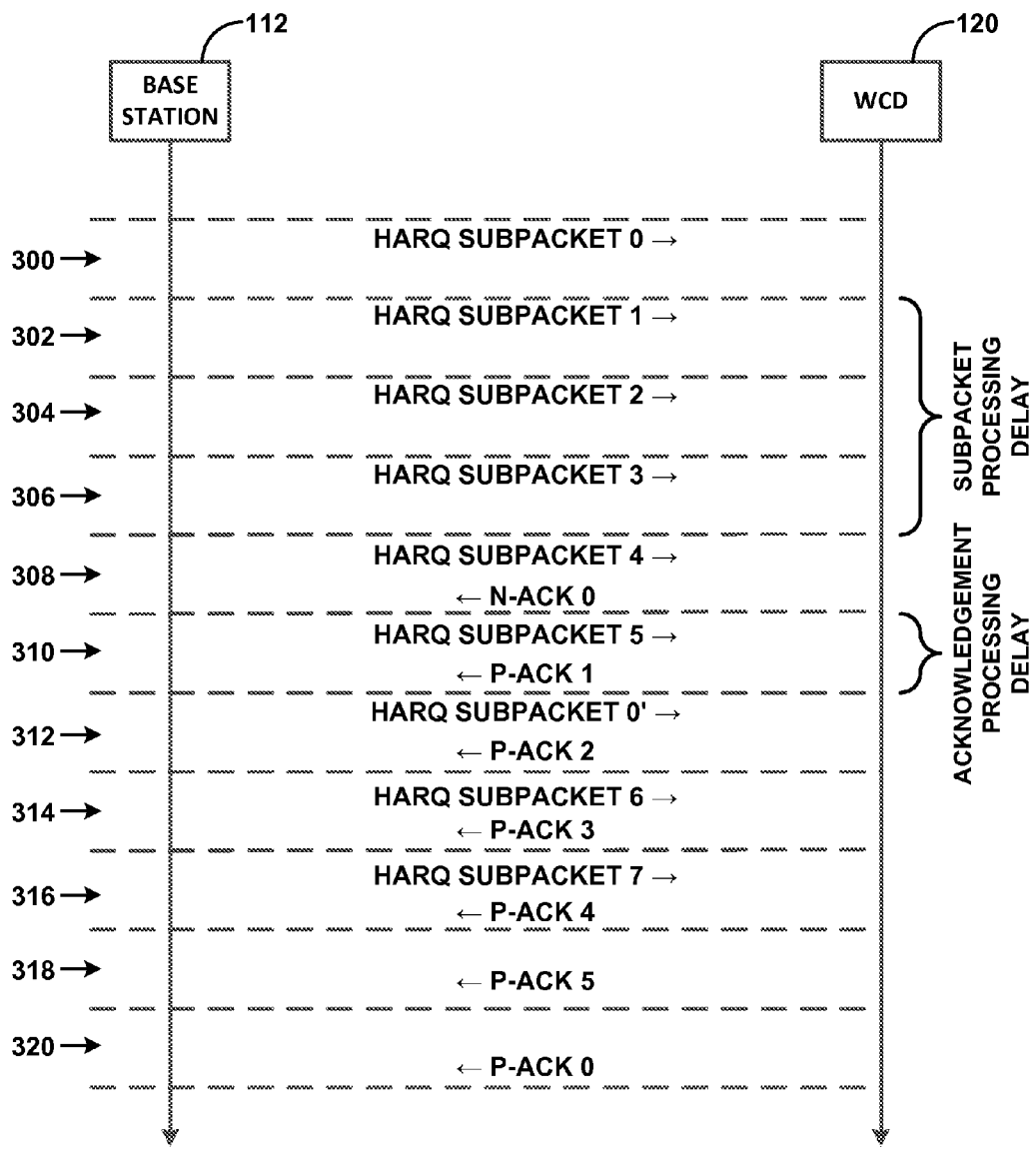
FIG. 3 illustrates unbundled HARQ transmissions, in accordance with an example embodiment.

FIG. 3 illustrates a series of HARQ transmissions between base station 112 and WCD 120 in an FDD system. Thus, in each of time slots 300-320, either or both base station 112 and WCD 120 may transmit to one another, perhaps simultaneously, on different frequencies. For purposes of simplicity, it is assumed that base station 112 has eight HARQ subpackets queued to transmit to WCD 120.

Starting in time slot 300, base station 112 begins transmitting the HARQ subpackets to WCD 120. In time slot 300, base station 112 transmits HARQ subpacket 0. In time slot 302, base station 112 transmits HARQ subpacket 1. In time slot 304, base station 112 transmits HARQ subpacket 2. In time slot 306, base station 112 transmits HARQ subpacket 3.

As an example, it is assumed that WCD 120 uses three full time slots to process each HARQ subpacket. Thus, the first opportunity that WCD 120 has to transmit a HARQ acknowledgment to base station 112 is time slot 308. In this time slot, WCD 120 N-ACKs HARQ subpacket 0, indicating that WCD 120 was unable to properly process or decode this subpacket. It is also assumed, for example, that base station 112 uses one full time slot to process each HARQ acknowledgment. Therefore, the earliest time slot in which base station 112 can respond to the N-ACK is time slot 312.

In time slot 312, base station 112 transmits HARQ subpacket 0', which may be identical to HARQ subpacket 0. Alternatively, HARQ subpacket 0' may be different from HARQ subpacket 0', but derived from the same full packet as HARQ subpacket 0. For instance, HARQ subpacket 0 and HARQ subpacket 0' may have similar or the same payload bits, but different FEC bits. WCD 120 also transmits a P-ACK for HARQ subpacket 2 in this time slot.

In the interim time slot, time slot 310, base station 112 transmits HARQ subpacket 5 to WCD 120, and WCD 120 transmits a P-ACK of HARQ subpacket 1. In time slots 314 and 316, base station 112 transmits HARQ subpackets 6 and 7, respectively, and WCD 120 transmits P-ACKs to HARQ subpackets 3 and 4, respectively.

In time slots 318 and 320, base station 112 does not transmit HARQ subpackets because it has transmitted all eight that it had queued for transmission. However, should any further N-ACKs be received from WCD 120, base station 112 may retransmit the associated HARQ subpackets. Nonetheless, in time slots 318 and 320, WCD 120 transmits P-ACKs to HARQ subpackets 5 and 0, respectively.

The latter P-ACK indicates that WCD 120 properly processed and decoded HARQ subpacket 0. For instance, this P-ACK may mean that WCD 120 combined the information that it received in HARQ subpacket 0 and HARQ subpacket 0' during time slots 300 and 312 such that WCD 120 was able to properly process and decode the full packet from which these subpackets were derived.

FIG. 3 depicts just one possible HARQ transmission scenario. Other scenarios may exist. In some of these scenarios, there may be more or fewer N-ACKs, and the general pattern of HARQ subpacket transmission and associated HARQ acknowledgments may vary. Thus, FIG. 3 should be considered illustrative and non-limiting.

Figure 4:
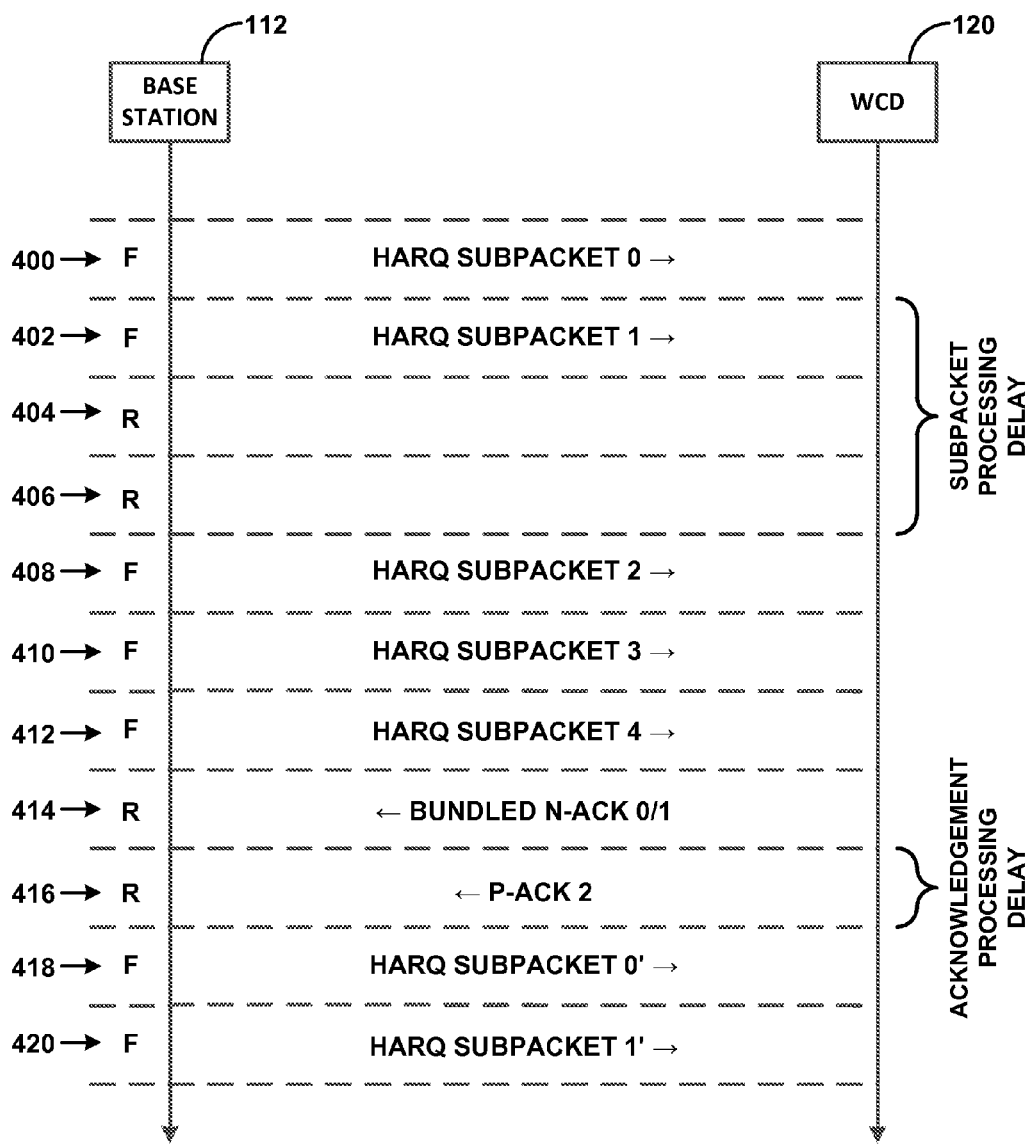
FIG. 4 illustrates bundled HARQ transmissions, in accordance with an example embodiment.

FIG. 4 illustrates a series of HARQ transmissions between base station 112 and WCD 120 in a TDD system. In a TDD system, each time slot may be used for either forward-direction transmission or reverse-direction transmission. Thus, in each of time slots 400-420, either base station 112 or WCD 120, but not both, may transmit.

In such a TDD system, the number of time slots per frame (where a frame is a repeating sequence of consecutive time slots) may be asymmetric. For instance, to accommodate client/server traffic in which client devices tend to receive more bearer data than they transmit, more TDD slots may be dedicated to supporting forward-direction traffic than reverse-direction traffic. As just one example, FIG. 4 depicts a frame of eleven time slots, seven of which are forward-direction (indicated by an "F"), and four of which are reverse-direction (indicated by an "R").

Due to such asymmetry, there may be more opportunities for HARQ transmission than HARQ acknowledgment transmission in a given frame. Thus, it may be beneficial to bundle HARQ acknowledgments. When HARQ acknowledgments are bundled, a single HARQ acknowledgment serves to acknowledge more than one HARQ subpacket. As a possible result, more HARQ transmissions can be supported with fewer time slots.

For instance, in a possible configuration that is depicted in FIG. 4, each HARQ acknowledgment may acknowledge up to two consecutive HARQ subpackets. If the HARQ acknowledgment is a P-ACK, then it serves to positively acknowledge both of the two associated HARQ subpackets. However, if the HARQ acknowledgment is an N-ACK, it indicates that one, the other, or both of the two associated HARQ subpackets were not properly received. After such an N-ACK is received, the base station may retransmit the two associated HARQ subpackets or some variation of these HARQ subpackets.

In FIG. 4, base station 112 transmits HARQ subpackets 0 and 1 in forward-direction time slots 400 and 402, respectively. As was the case for FIG. 3, it is assumed that WCD 120 uses three full time slots to process each HARQ subpacket and that base station 112 uses one full time slot to process each HARQ acknowledgment. Thus, in reverse-direction time slots 404 and 406, WCD 120 is not yet able to acknowledge HARQ subpackets 0 or 1.

In forward-direction time slots 408, 410, and 412, base station 112 transmits HARQ subpackets 2, 3, and 4, respectively. In reverse-direction time slot 414, WCD 120 has its first opportunity to acknowledge HARQ subpackets 0 or 1. WCD 120 transmits a bundled N-ACK for HARQ subpackets 0 or 1 in this time slot. This indicates that WCD 120 was unable to properly process or decode either HARQ subpacket 0, HARQ subpacket 1, or both.

On the other hand, in reverse-direction time slot 416, WCD 120 transmits a P-ACK for HARQ subpacket 2, indicating that WCD 120 was able to properly process and decode HARQ subpacket 2. Regardless, in forward-direction time slots 418 and 420, base station 112 transmits HARQ subpackets 0' and 1', respectively.

HARQ subpacket 0' may be identical to HARQ subpacket 0. Alternatively, HARQ subpacket 0' may be different from HARQ subpacket 0', but derived from the same full packet as HARQ subpacket 0. For instance, HARQ subpacket 0 and HARQ subpacket 0' may have similar or the same payload bits, but different FEC bits. Similarly, HARQ subpacket 1' may be identical to HARQ subpacket 1. Alternatively, HARQ subpacket 1' may be different from HARQ subpacket 1', but derived from the same full packet as HARQ subpacket 1. Likewise, HARQ subpacket 1 and HARQ subpacket 1' may have similar or the same payload bits, but different FEC bits.

As noted above, a possible disadvantage to bundled HARQ acknowledgments is that when one HARQ subpacket in a group of HARQ subpackets associated with same HARQ acknowledgment is not properly received, all of the HARQ subpackets in the group may be re-transmitted. This can be wasteful since retransmission of the properly received HARQ subpackets is not necessary.

In order to accommodate for this disadvantage, HARQ bundling may be activated when it is likely that fewer N-ACKs will be transmitted. Similarly, HARQ bundling may be deactivated when it is likely that a greater number of N-ACKs will be transmitted. One way determining the likelihood of N-ACK transmission is based on the forward-channel signal quality reported by the WCD receiving HARQ subpackets. For instance, if the WCD reports a high signal quality, then it is likely that the WCD will be able to properly process and decode HARQ subpackets, and therefore may transmit more P-ACKs and fewer N-ACKs. On the other hand, if the WCD reports a low signal quality, then it is less likely that the WCD will be able to properly process and decode HARQ subpackets, and therefore may transmit more N-ACKs and fewer P-ACKs.

Thus, a threshold signal quality value may be determined. If the WCD reports a forward-direction signal quality that meets or exceeds this threshold, HARQ bundling may be used. However, if the WCD reports a forward-direction signal quality that does not meet or exceed this threshold, HARQ bundling might not be used.

One way in which a WCD may report signal quality in an LTE system is by transmitting a channel quality indication (CQI) in the reverse direction. A CQI report may be carried by a physical uplink control channel (PUCCH) or a physical uplink shared channel (PUSCH) of the air interface. The CQI report may contain number between 1 and 15 that represents signal quality. The higher this value, the higher the modulation scheme coding rate that the base station may use in subsequent forward direction transmissions (e.g., 2 bits per symbol with quadrature phase-shift keying (QPSK), 6 bits per symbol with 64-point quadrature amplitude modulation (64QAM), etc.). Thus, the CQI may also be a reasonably accurate indicator of the extent to which the WCD will transmit P-ACKs or N-ACKs in the near future.

Nonetheless, other types of signal quality measurement reports may be used, instead of or in addition to CQI reports, to activate or deactivate HARQ bundling. For instance, in CDMA systems, active set measurement reports or neighbor reports may be used for this purpose.

4. Example Operations

Figure 5:
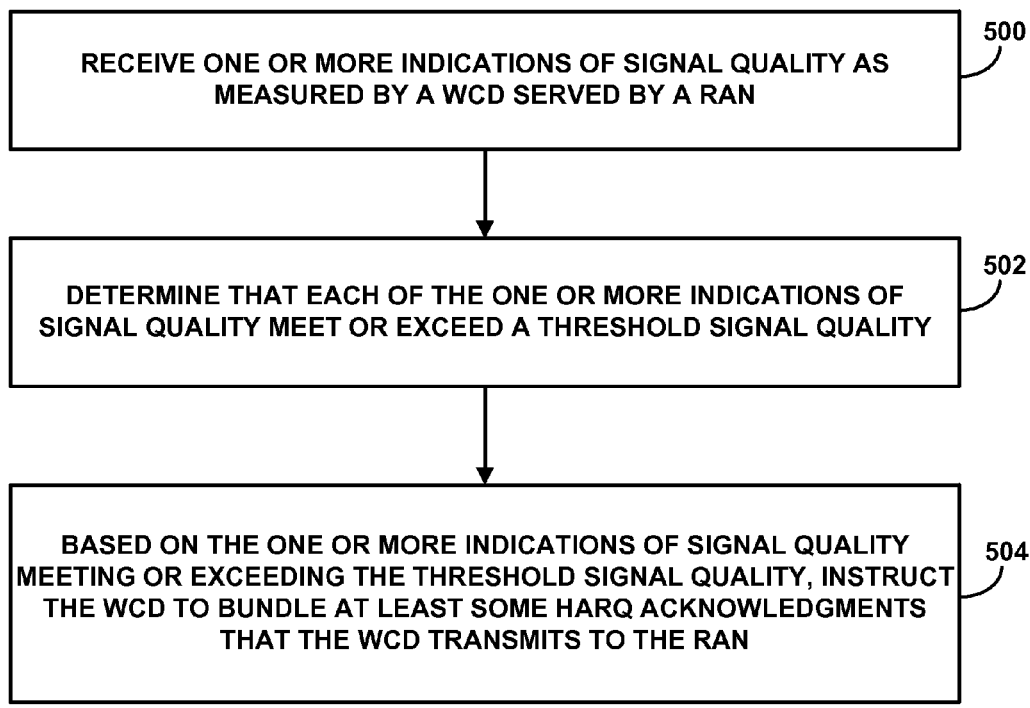
FIG. 5 is a flow chart, in accordance with an example embodiment.
Figure 6:
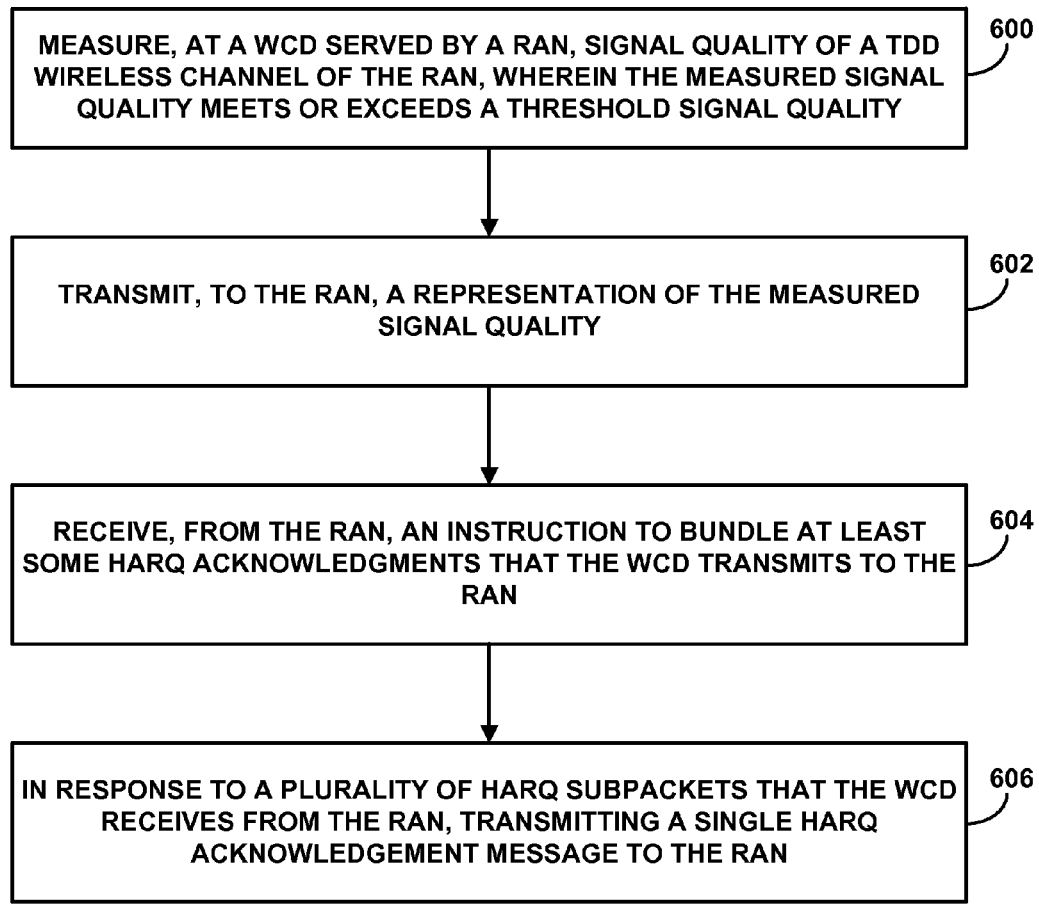
FIG. 6 is another flow chart, in accordance with an example embodiment.

FIGS. 5 and 6 are flow charts in accordance with example embodiments. The operations illustrated by these flow charts may be carried out by a computing device, such as computing device 200. In some embodiments, computing device 200 may represent a WCD and/or a RAN device, such as a base station.

At block 500 of FIG. 5, one or more indications of signal quality as measured by a WCD served by a RAN may be received. The WCD and RAN may communicate using a time-division duplex (TDD) wireless channel in which the forward-direction traffic is separated from reverse-direction traffic by allocation of different respective time slots in a particular frequency band. The one or more indications of signal quality may consist of a single indication of signal quality, two or more consecutively received indications of signal quality, or some other pattern of indications of signal quality. Further, the indications of signal quality may indicate the signal quality that the WCD receives on the forward-direction time slots of the TDD wireless channel.

At block 502, it may be determined that each of the one or more indications of signal quality meet or exceed a threshold signal quality. At block 504, based on the one or more indications of signal quality meeting or exceeding the threshold signal quality, the WCD may be instructed to bundle at least some HARQ acknowledgments that the WCD transmits to the RAN.

Bundling at least some HARQ acknowledgments that the WCD transmits to the RAN may involve, in response to a plurality of HARQ subpackets that the RAN transmits to the WCD, the RAN receiving a single HARQ acknowledgment message from the WCD. The single HARQ acknowledgment message may be a P-ACK message that indicates that each of the plurality of HARQ subpackets was successfully received by the WCD.

Alternatively, the single HARQ acknowledgment message may be an N-ACK message that indicates that at least one of the plurality of HARQ subpackets was not successfully received by the WCD. In some embodiments, the first plurality of HARQ subpackets may be derived from one or more full packets may involve. Possibly based on the single HARQ acknowledgment message being the N-ACK message that indicates that at least one of the plurality of HARQ subpackets was not successfully received by the WCD, a replacement HARQ subpacket may be transmitted to the WCD. A HARQ subpacket not successfully received by the WCD, and the replacement HARQ subpacket, may be derived from the same, common full packet.

After instructing the WCD to bundle at least some HARQ acknowledgments that the WCD transmits to the RAN, one or more further indications of signal quality as measured by the WCD may be received. It may be determined that at least some of the one or more further indications of signal quality do not meet or exceed the threshold signal quality. Based on the one or more further indications of signal quality not meeting or exceeding the threshold signal quality, the WCD may be instructed to not bundle any HARQ acknowledgments that the WCD transmits to the RAN. Not bundling any HARQ acknowledgments that the WCD transmits to the RAN may involve, in response to each HARQ subpacket of a plurality of HARQ subpackets that the RAN transmits to the WCD, the RAN receiving respective separate HARQ acknowledgment messages from the WCD.

At block 600 of FIG. 6, a WCD served by a RAN may measure signal quality of a TDD wireless channel of the RAN. The measured signal quality may meet or exceed a threshold signal quality.

At block 602, the WCD may transmit, to the RAN, a representation of the measured signal quality. At block 604, the WCD may receive, from the RAN, a first instruction to bundle at least some HARQ acknowledgments that the WCD transmits to the RAN. The first instruction may be received in response to the measured signal quality meeting or exceeding the threshold signal quality.

At block 606, in response to a plurality of HARQ subpackets that the WCD receives from the RAN, the WCD may transmit a single HARQ acknowledgment message to the RAN. The single HARQ acknowledgment message may be a P-ACK message that indicates that each of the plurality of HARQ subpackets was successfully received by the WCD. Alternatively, the single HARQ acknowledgment message may be an N-ACK message that indicates that at least one of the plurality of HARQ subpackets was not successfully received by the WCD.

After receiving the instruction to bundle at least some HARQ acknowledgments that the WCD transmits to the RAN, the WCD may measure further signal quality of the TDD wireless channel of the RAN. The measured further signal quality might not meet or exceed the threshold signal quality. The WCD may transmit, to the RAN, a representation of the measured further signal quality. The WCD may also receive, from the RAN, a second instruction not to bundle any HARQ acknowledgments that the WCD transmits to the RAN. The second instruction may be received in response to the measured signal quality not meeting or exceeding the threshold signal quality. In response to each HARQ subpacket of a plurality of HARQ subpackets that the RAN transmits to the WCD, the WCD may transmit respective separate HARQ acknowledgment messages.

In another embodiment illustrated by a combination of FIGS. 1-6, a RAN may include a base station device, a signal quality assessment module, and a communication module. For instance, the base station device include computing device 200, where the communication module includes network communication interface 202, and the signal quality assessment module includes software in program instructions 210 and/or data in data 212. The base station device may be configured to define one or more TDD wireless channels that can serve WCDs.

The signal quality assessment module may be configured to receive signal quality indications from served WCDs and determine whether the signal quality indications meet or exceed a signal quality threshold. The signal quality indications may include two or more consecutively received indications of signal quality.

The communication module may be configured to support a first mode and a second mode of HARQ communication between the base station and the served WCDs. The RAN may be configured to enter the first mode for a particular served WCD in response to the signal quality assessment module receiving, from the particular served WCD, one or more signal quality indications that meet or exceed the signal quality threshold. The RAN may be configured to enter the second mode for the particular served WCD in response to the signal quality assessment module receiving, from the particular served WCD, one or more signal quality indications that do not meet or exceed the signal quality threshold. The first mode may involve the base station instructing the particular served WCD to bundle at least some HARQ acknowledgments that the particular served WCD transmits to the base station. The second mode may involve the base station instructing the particular served WCD to not bundle any HARQ acknowledgments that the particular served WCD transmits to the base station.

Not bundling any HARQ acknowledgments that the particular served WCD transmits to the base station may involve, in response to each HARQ subpacket of a plurality of HARQ subpackets that the base station transmits to the WCD, the base station receiving respective separate HARQ acknowledgment messages from the particular served WCD.

Bundling at least some HARQ acknowledgments that the particular served WCD transmits to the base station may involve, in response to a plurality of HARQ subpackets that the base station transmits to the particular served WCD, the base station receiving a single HARQ acknowledgment message from the particular served WCD. The single HARQ acknowledgment message may be a P-ACK message that indicates that each of the plurality of HARQ subpackets was successfully received by the particular served WCD. Alternatively, the single HARQ acknowledgment message may be an N-ACK message that indicates that at least one of the plurality of HARQ subpackets was not successfully received by the particular served WCD.

Additionally, the first plurality of HARQ subpackets may be derived from one or more full packets. Possibly based on the single HARQ acknowledgment message being the N-ACK message that indicates that at least one of the plurality of HARQ subpackets was not successfully received by the WCD, a replacement HARQ subpacket may be transmitted to the WCD. A HARQ subpacket not successfully received by the WCD, and the replacement HARQ subpacket, may be derived from the same, common full packet.

5. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages can be executed out of order from that shown or discussed, including substantially concurrent or in reverse order, depending on the functionality involved. Further, more or fewer blocks and/or functions can be used with any of the ladder diagrams, scenarios, and flow charts discussed herein, and these ladder diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
receiving, at a radio access network (RAN), at least one indication of signal quality as measured by a wireless communication device (WCD) served by the RAN;
determining that each of the at least one indication of signal quality meets or exceeds a threshold signal quality, wherein indications of signal quality that meet or exceed the threshold signal quality are associated with a greater extent of positive acknowledgment messages received by the RAN than indications of signal quality that do not meet or exceed the threshold signal quality;
based on the at least one indication of signal quality meeting or exceeding the threshold signal quality, instructing the WCD to bundle at least one hybrid automatic repeat request (HARQ) acknowledgment that the WCD transmits to the RAN; and
receiving, at the RAN, a single HARQ acknowledgement message from the WCD in response to a plurality of HARQ subpackets that the RAN transmits to the WCD, wherein, when the single HARQ acknowledgement message from the WCD is a negative acknowledgement message that indicates that at least one of the plurality of HARQ subpackets was not successfully received by the WCD, the RAN transmits a replacement HARQ subpacket to the WCD, wherein the first plurality of HARQ subpackets is derived from one or more full packets, and wherein a HARQ subpacket not successfully received by the WCD and the replacement HARQ subpacket are derived from a common full packet.

2. The method of claim 1, wherein the at least one indication of signal quality consists of two or more consecutively received indications of signal quality.

3. The method of claim 1, further comprising:
after instructing the WCD to bundle at least one HARQ acknowledgment that the WCD transmits to the RAN, receiving one or more further indications of signal quality as measured by the WCD;
determining that at least one of the one or more further indications of signal quality do not meet or exceed the threshold signal quality; and
based on the one or more further indications of signal quality not meeting or exceeding the threshold signal quality, instructing the WCD to not bundle any HARQ acknowledgments that the WCD transmits to the RAN.

4. The method of claim 3, wherein not bundling any HARQ acknowledgments that the WCD transmits to the RAN comprises:
in response to each HARQ subpacket of a plurality of HARQ subpackets that the RAN transmits to the WCD, the RAN receiving respective separate HARQ acknowledgment messages from the WCD.

5. The method of claim 1, wherein the WCD and RAN communicate using a time-division duplex (TDD) wireless channel in which the forward-direction traffic is separated from reverse-direction traffic by allocation of different respective time slots in a particular frequency band.

6. The method of claim 1, wherein the at least one indication of signal quality includes at least one channel quality indication (CQI) report,
wherein each CQI report includes a respective value in a range of 1 to 15 that represents signal quality,
wherein a higher value in the range is associated with a higher number of positive acknowledgment messages received by the RAN than a lower value in the range, wherein the threshold signal quality is in the range from 1 to 15, and
wherein determining that each of the at least one indication of signal quality meets or exceeds a threshold signal quality comprises, for each particular CQI report of the at least one CQI report:
reading the at least one CQI report to determine the respective value of the particular CQI report; and
comparing the respective value of the particular CQI report to the threshold signal quality to determine that the respective value of the particular CQI report meets or exceeds the threshold value.

7. A method comprising:
measuring, at a wireless communication device (WCD) served by a radio access network (RAN), signal quality of a time-division duplex (TDD) wireless channel of the RAN, wherein the measured signal quality meets or exceeds a threshold signal quality, wherein signal quality measurements that meet or exceed the threshold signal quality are associated with a greater extent of positive acknowledgment messages received by the RAN than signal quality measurements that do not meet or exceed the threshold signal quality;
transmitting, to the RAN, a representation of the measured signal quality;
receiving, from the RAN, a first instruction to bundle at least one hybrid automatic repeat request (HARQ) acknowledgment that the WCD transmits to the RAN, wherein the first instruction is received in response to the measured signal quality meeting or exceeding the threshold signal quality; and
in response to a plurality of HARQ subpackets that the WCD receives from the RAN, transmitting a single HARQ acknowledgment message to the RAN,
wherein, when the single HARQ acknowledgement message from the WCD is a negative acknowledgement message that indicates that at least one of the plurality of HARQ subpackets was not successfully received by the WCD, the WCD receives from the RAN a replacement HARQ subpacket, wherein the first plurality of HARQ subpackets is derived from one or more full packets, and wherein a HARQ subpacket not successfully received by the WCD and the replacement HARQ subpacket are derived from a common full packet.

8. The method of claim 7, further comprising:
after receiving the first instruction, measuring further signal quality of the TDD wireless channel of the RAN, wherein the measured further signal quality does not meet or exceed the threshold signal quality;
transmitting, to the RAN, a representation of the measured further signal quality;
receiving, from the RAN, a second instruction not to bundle any HARQ acknowledgments that the WCD transmits to the RAN, wherein the second instruction is received in response to the measured further signal quality not meeting or exceeding the threshold signal quality; and
in response to each HARQ subpacket of a plurality of HARQ subpackets that the RAN transmits to the WCD, transmitting respective separate HARQ acknowledgment messages.

9. A radio access network (RAN) comprising:
a base station configured to define one or more time-division duplex (TDD) wireless channels that serve wireless communication devices (WCDs);

at least one processor;
data storage; and
program instructions stored in the data storage and executable by the at least one processor to cause the RAN to perform operations comprising:
  receiving at least one signal quality indication from a WCD served by the base station, wherein the RAN is configured to support a first mode and a second mode of hybrid automatic repeat request (HARQ) communication between the base station and WCDs served by the base station, wherein operation in the first mode of HARQ communication involves the base station instructing the WCD to transmit a single HARQ acknowledgment message in response to a plurality of HARQ subpackets that the base station transmits to the WCD, and operation in the second mode of HARQ communication involves the base station instructing the WCD to not bundle any HARQ acknowledgments that the WCD transmits to the base station;
  making a determination of whether the received at least one signal quality indication meets or exceeds a signal quality threshold, wherein signal quality indications that meet or exceed the signal quality threshold are associated with a greater extent of positive acknowledgment messages received by the RAN than signal quality indications that do not meet or exceed the signal quality threshold;
  in response to the determination being that one or more of the received at least one signal quality indication meet or exceed the signal quality threshold, then operating the base station in the first mode of HARQ communication for the WCD; and
  in response to the determination being that one or more of the received at least one signal quality indications do not meet or exceed the signal quality threshold, then operating the base station in the second mode of HARQ communication for the WCD,
  wherein the base station is further configured to, when the single HARQ acknowledgement message from the WCD is a negative acknowledgement message that indicates that at least one of the plurality of HARQ subpackets was not successfully received by the WCD, transmit a replacement HARQ subpacket to the WCD, wherein the first plurality of HARQ subpackets is derived from one or more full packets, and wherein a HARQ subpacket not successfully received by the WCD and the replacement HARQ subpacket are derived from a common full packet.

10. The RAN of claim 9, wherein instructing the WCD to not bundle any HARQ acknowledgments that the WCD transmits to the base station comprises:
  instructing the WCD to transmit respective separate HARQ acknowledgment messages in response to each HARQ subpacket of a plurality of HARQ subpackets that the base station transmits to the WCD.

11. The RAN of claim 9, wherein the at least one indication of signal quality includes at least one channel quality indication (CQI) report,
  wherein each CQI report includes a respective value in a range of 1 to 15 that represents signal quality,
  wherein a higher value in the range is associated with a higher number of positive acknowledgment messages received by the RAN than a lower value in the range,
  wherein the threshold signal quality is in the range from 1 to 15, and
  wherein determining that each of the at least one indication of signal quality meets or exceeds a threshold signal quality comprises, for each particular CQI report of the at least one CQI report:
    reading the at least one CQI report to determine the respective value of the particular CQI report; and
    comparing the respective value of the particular CQI report to the threshold signal quality to determine that the respective value of the particular CQI report meets or exceeds the threshold value.

* * * * *